United States Patent
Jäger

(10) Patent No.: US 7,930,946 B2
(45) Date of Patent: Apr. 26, 2011

(54) DEVICE FOR SIMULTANEOUS MEASUREMENT OF FORCES

(75) Inventor: Gerd Jäger, Illmenau (DE)

(73) Assignee: SIOS Meβtechnik GmbH, Ilmenau (DE)

( * ) Notice: Subject to any disclaimer, the term of this patent is extended or adjusted under 35 U.S.C. 154(b) by 49 days.

(21) Appl. No.: 12/176,240

(22) Filed: Jul. 18, 2008

(65) Prior Publication Data

US 2009/0019948 A1    Jan. 22, 2009

(30) Foreign Application Priority Data

Jul. 18, 2007  (DE) .................. 10 2007 033 441

(51) Int. Cl.
*G01L 1/22* (2006.01)
(52) U.S. Cl. ..................................... 73/862.045; 73/105
(58) Field of Classification Search ............. 73/862.045, 73/862.391, 862.451, 862.474, 862.625, 73/862.639
See application file for complete search history.

(56) References Cited

U.S. PATENT DOCUMENTS

| | | | | |
|---|---|---|---|---|
| 4,479,385 A * | 10/1984 | Koehler | .................. | 73/514.29 |
| 4,655,305 A * | 4/1987 | Jacobson | .................. | 177/211 |
| 5,079,958 A * | 1/1992 | Takase et al. | ............ | 73/862.625 |
| 5,113,698 A * | 5/1992 | Grlj et al. | .................. | 73/862.59 |
| 5,123,035 A * | 6/1992 | Hottinger et al. | ................ | 377/20 |
| 5,483,822 A * | 1/1996 | Albrecht et al. | ................ | 73/105 |
| 5,583,286 A * | 12/1996 | Matsuyama | .................... | 73/105 |
| 5,633,455 A * | 5/1997 | Quate | ............. | 73/105 |
| 5,753,912 A * | 5/1998 | Matsuyama | .................... | 850/60 |
| 5,825,020 A | 10/1998 | Hansma et al. | | |
| 5,908,981 A * | 6/1999 | Atalar et al. | .................... | 73/105 |
| 6,745,618 B2 * | 6/2004 | Imai et al. | ........................ | 73/105 |
| 7,596,989 B2 * | 10/2009 | Humphris et al. | ............ | 73/105 |
| 2002/0178801 A1 | 12/2002 | Takahashi et al. | | |
| 2006/0238206 A1 * | 10/2006 | Eng et al. | ...................... | 324/750 |

FOREIGN PATENT DOCUMENTS

| | | |
|---|---|---|
| DE | 199 01 831 A1 | 7/2000 |
| DE | 102 24 212 A1 | 12/2002 |
| JP | 2000258332 | 9/2000 |

* cited by examiner

*Primary Examiner* — Freddie Kirkland, III
(74) *Attorney, Agent, or Firm* — Muncy, Geissler, Olds & Lowe, PLLC

(57) ABSTRACT

A device is provided for simultaneous determination of forces, comprising an arrangement of parallel springs with integrated piezoresistive resistances in the form of a full Wheatstone bridge. The parallel springs, have, for example, silicon or fused quartz, are arranged in lines, wherein the parallel springs at their ends are permanently connected by silicon or fused quartz spacers. At the free ends of the parallel springs, measurement-technology elements are arranged. The opposite ends of the parallel springs are fastened to a frame.

5 Claims, 5 Drawing Sheets

DEVICE FOR SIMULTANEOUS MEASUREMENT OF FORCES

This nonprovisional application claims priority under 35 U.S.C. §119(a) to German Patent Application No. DE 10 2007 033 441, which was filed in Germany on Jul. 18, 2007, and which is herein incorporated by reference.

BACKGROUND OF THE INVENTION

1. Field of the Invention

The present invention relates to a device for measurement of forces with a parallel spring arrangement. The invention is particularly suitable for the determination of forces and masses of small objects. The device in accordance with the invention can also be used for simultaneous measurement of surface profiles at several points.

2. Description of the Background Art

Various arrangements are known from the conventional art for force measurement or mass determination of objects and for measurement of surface profile deviations.

In numerous applications, bendable elements with strain gages applied to them are used for force measurement. For higher requirements in force measurement and weighing technology, deformation element parallel springs, for example made of aluminum, are used. Strain gages are likewise glued onto the surface of these deformation element parallel springs. Since the deformation element parallel springs exhibit both expansion and compression zones, the strain gages can be evaluated in full-bridge circuits. One drawback in this case is that the manufacturing of the strain gage force sensors requires a technologically intricate process. An additional drawback is the limited accuracy of these force sensors, especially for the measurement of small forces.

For determining the surface profiles of objects, silicon cantilevers in atomic force microscopes with resolutions in the nanometer and subnanometer range are used. The cantilevers used are silicon bending beams with piezoresistive resistances, which are connected into a bridge. Since these bending beam cantilevers have only positive or negative length expansions, full-bridge circuits cannot be realized. An ideal full-bridge circuit with piezoresistive resistances is only possible with a parallel spring arrangement.

It is also known to use cantilevers which have reflective surfaces at their free ends, the deflection of which is detected with flat-mirror interferometers. However, because of the inclination of the bending beam cantilevers at their free ends, flat-mirror interferometers can be used only at very small elongations and compressions.

SUMMARY OF THE INVENTION

It is therefore an object of the present invention to provide a device that makes possible a substantially simultaneous ascertainment of forces and a precise determination of the profile deviations of surfaces at several points simultaneously.

In an embodiment, the device comprises a parallel spring arrangement, especially made of silicon or fused quartz. The parallel springs include upper and lower springs that are connected by spacers made of silicon or fused quartz. One end of each of the parallel springs is fastened to a frame. Because the parallel springs have an inflection point in the course of their bending, there are zones in which the absolute values of the expansions and compressions are equal. In this way it is possible to realize an ideal full Wheatstone bridge with piezoresistive resistances in all parallel springs.

Parallel springs having silicon can be manufactured cost-advantageously and with high reproducibility by means of semiconductor technology and micromechanics. In this case, linear arrangements of silicon parallel springs can advantageously be manufactured even in large quantities. If the silicon parallel springs do not have a rectangular shape, but rather a triangular shape, the mechanical elongations and stresses in the triangular areas are practically constant. The silicon parallel springs are advantageously made in double triangular form, i.e., the parallel springs have a kind of butterfly shape. This results in position independence of the piezoresistive resistances and thus an offset-free bridge circuit. If the silicon parallel springs have a rectangular shape, the mechanical elongations and stresses have gradients. Therefore, the piezoresistive resistances should be positioned exactly to keep the offset stress of the bridge low. This is generally not adequately possible.

If silicon spikes with radii of only a few nanometers are attached to the free ends of the silicon parallel springs, parallel spring cantilevers are formed which in contrast to the bending beam cantilevers of today's atomic force microscopes have no so-called arc errors. This is an additional essential advantage of the arrangement in accordance with the invention.

In this way, object surfaces at several different points on the object can be scanned and the surface profile deviations ascertained with the highest possible precision.

If silicon probe elements are located on the free ends of the silicon parallel springs both on the top side and at the opposite points on the underside, for example, diameters of holes and the distances between grooves or bars can be measured.

If weighing pans are attached to the free ends of the parallel springs and the objects to be weighed are passed over the pans in a suitable way using delivery and removal devices, the masses of the objects to be weighed can be determined in parallel with high effectiveness.

The parallel spring arrangements made of fused quartz can be manufactured economically with the aid of etching technology and modern precision machinery. At the free ends of the fused quartz parallel springs, spikes or probe elements made of hard metal or diamond and with different radii can be attached. The deflections of the fused quartz parallel springs are advantageously measured optically. For this purpose, autofocusing sensors or flat mirror interferometers can be used. The combination of fused quartz parallel springs or silicon parallel springs with a flat mirror interferometer guarantees the highest possible precision.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Corresponding parts are provided with the same reference numbers in all figures.

Figure 1:
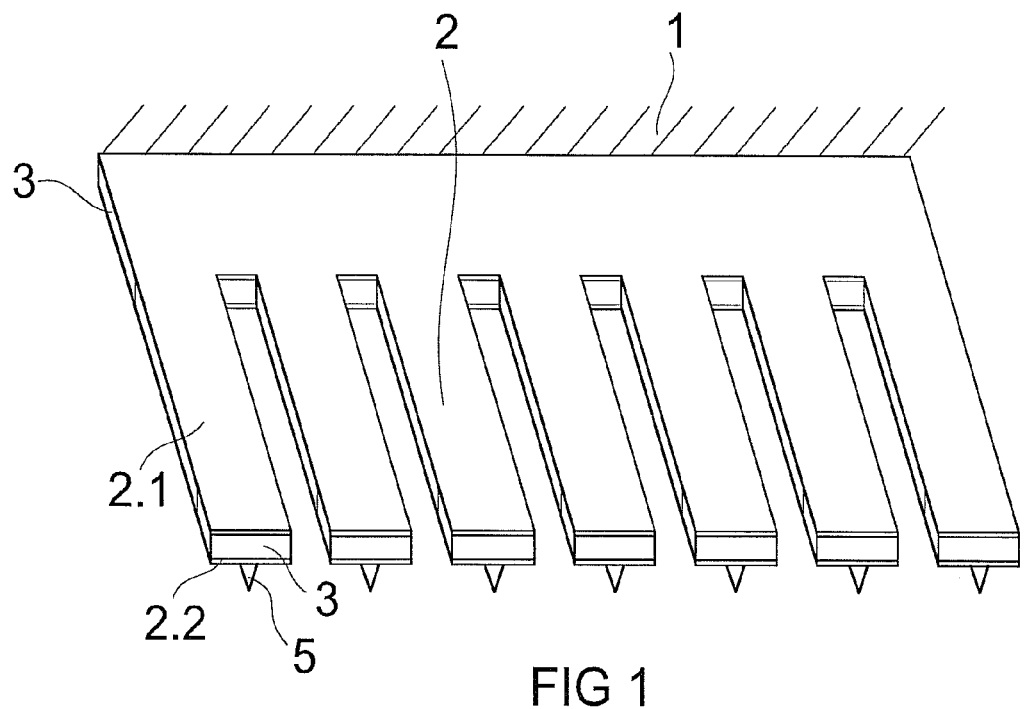
FIG. 1 is a perspective view of a linear arrangement of several parallel springs with respective spacers.

FIG. 1 shows a linear arrangement of several parallel springs 2. The upper springs 2.1 are connected by spacers 3 with the lower springs 2.2. The springs 2.1 and 2.2 as well as the spacers 3 preferably are made of fused quartz or silicon. The springs 2.1 and 2.2 each form a parallel spring 2. The distances between the individual parallel springs 2 can be selected at will and adapted to measurement arrangements in which the parallel spring arrangement is used. The parallel spring arrangement can be mounted permanently on a frame 1. The linear arrangement of the parallel springs 2 makes possible the substantially simultaneous coverage of several points on an object. Depending on the parameters of the objects to be measured, the sizes of the areas of the assigned parallel springs can be varied. Measurement-technologic probe elements 5 are arranged on the free ends of the parallel springs 2.

Figure 2:
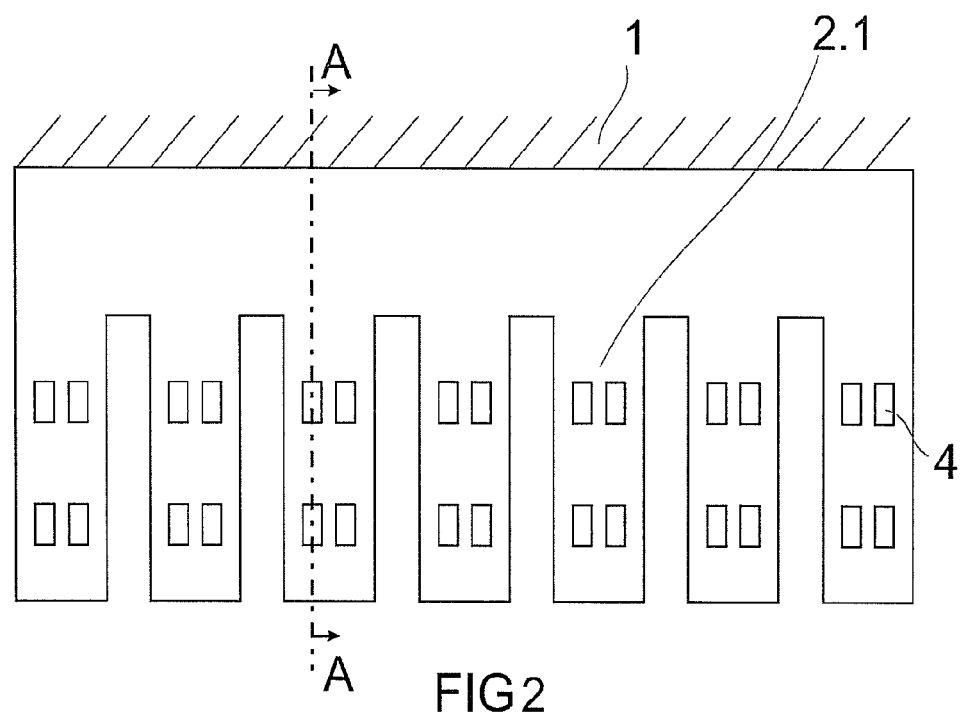
FIG. 2 is a top view of a representation of a parallel spring with integrated piezoresistive resistances.

In FIG. 2, the top view of an arrangement is shown, in which piezoresistive resistances are doped into the upper springs 2.1.

Figure 3:
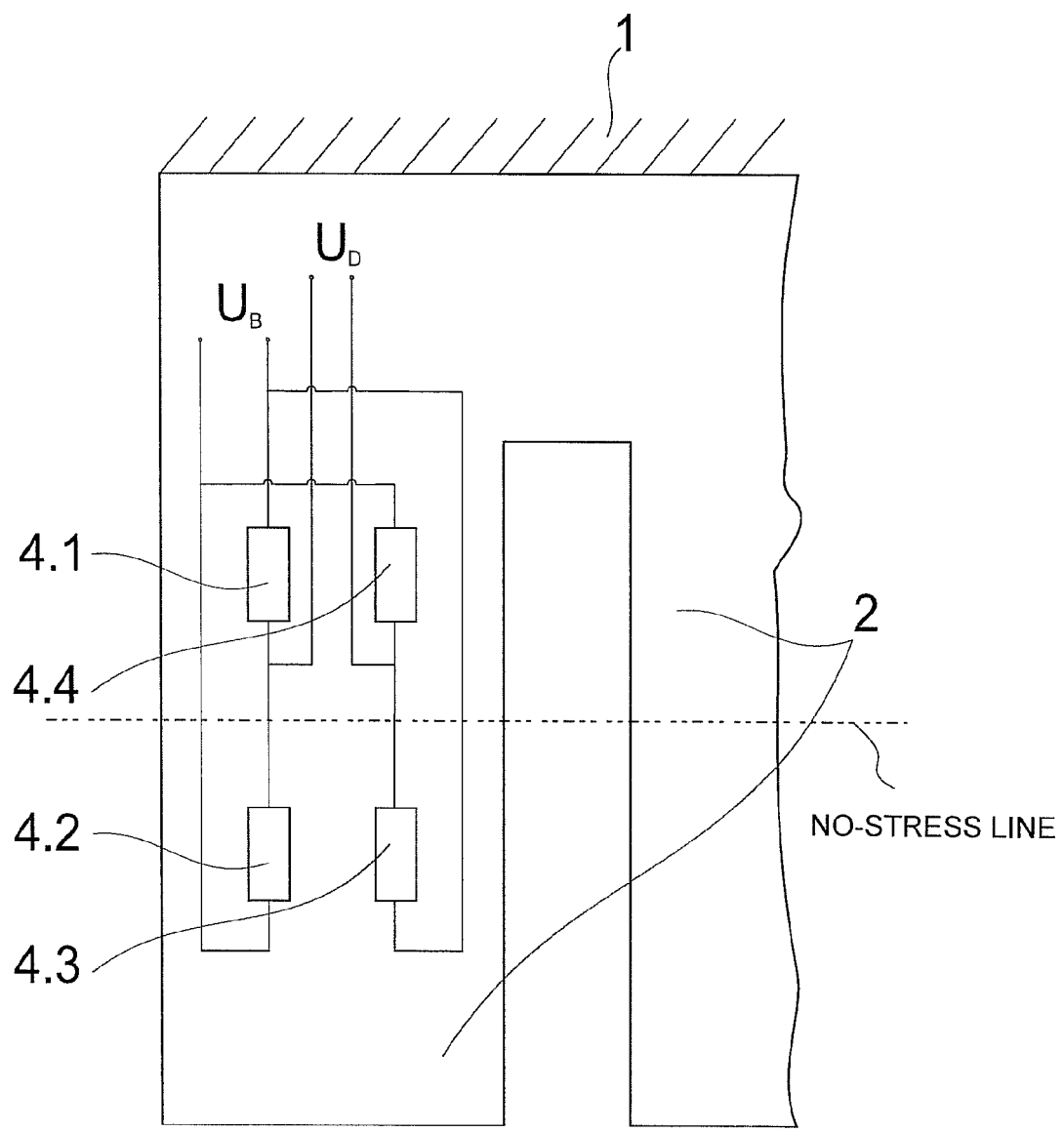
FIG. 3 is a top view of a cutaway of a parallel spring arrangement made of silicon with piezoresistive resistances.

FIG. 3 shows the top view of a cutaway of a parallel spring arrangement with piezoresistive resistances 4, which here are arranged in a Wheatstone bridge circuit. The piezoresistive resistances 4.1 . . . 4.4 are arranged symmetrically to the zero-stress line. In the case of a deflection of the parallel springs 2, the piezoresistive resistances 4.1 and 4.4 are elongated, while the piezoresistive resistances 4.2 and 4.3 are compressed. In this manner, zones with elongations and compressions result, the absolute amounts of which are equal. This makes possible the realization of Wheatstone full bridges with the supply voltages $U_B$ and the diagonal voltages $U_D$.

Figure 4:
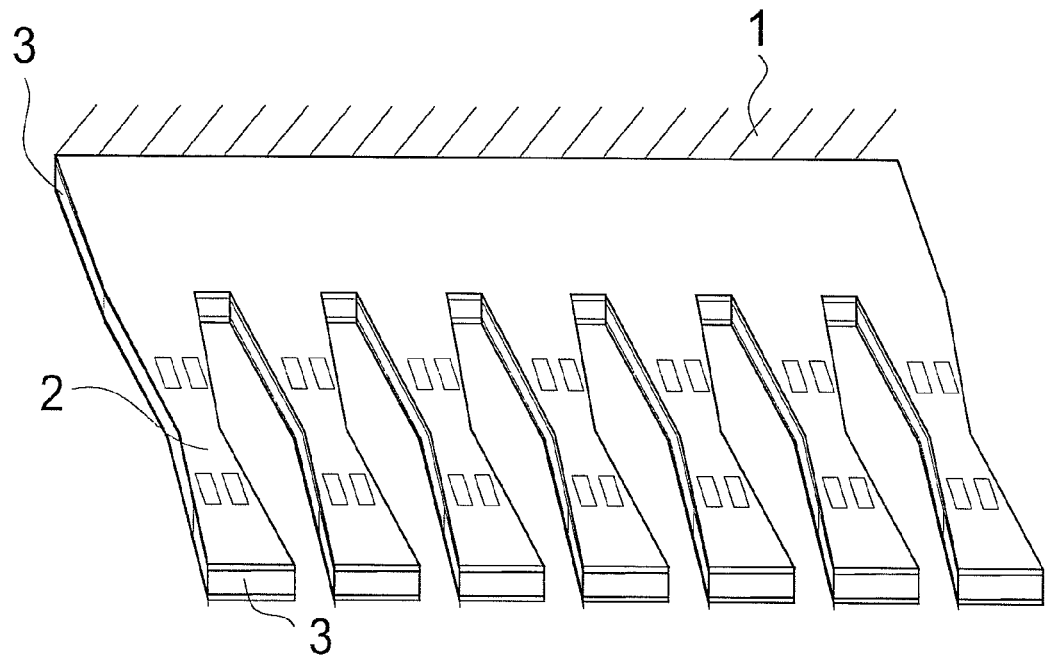
FIG. 4 is a perspective view of a linear arrangement of several parallel springs with variable cross sections.

FIG. 4 shows a silicon parallel spring arrangement in which the parallel springs 2 are triangular in shape. The embodiment shown involves a double triangle shape in the form of a butterfly. Since in this case the ratio of torque and resisting torque is constant, the mechanical elongations and stresses in the triangular surfaces are constant. Therefore, to achieve a full bridge, the piezoresistive resistances 4 need not be positioned precisely, as would be necessary in the case of a rectangular shape. In this way, in the case of a triangular shape of the silicon parallel springs, an ideal, offset-free full bridge can be realized.

Figure 5:
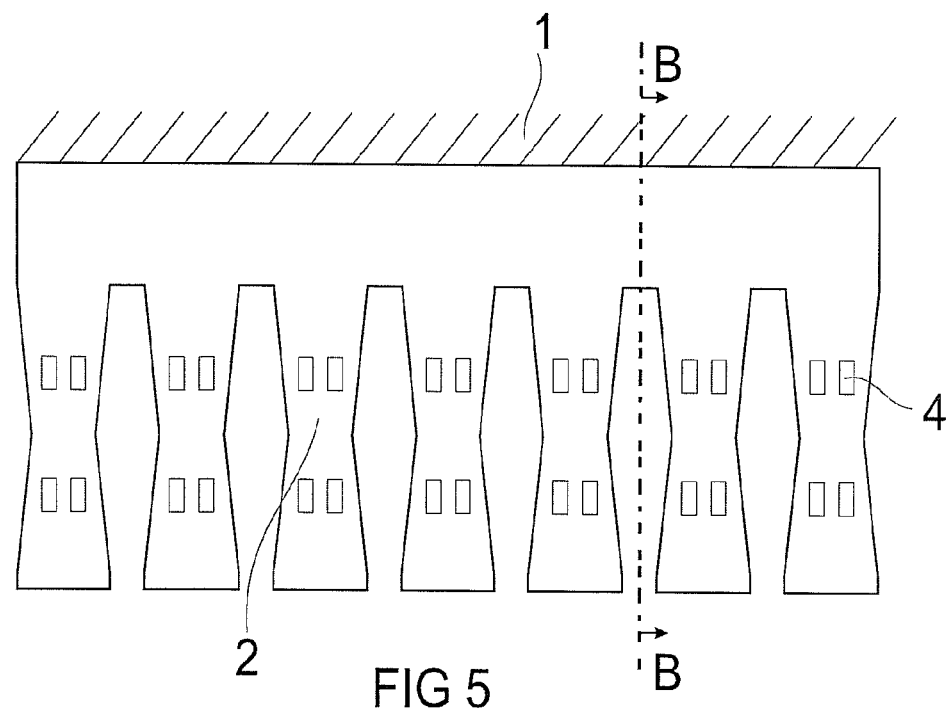
FIG. 5 is a top view of the arrangement shown in a perspective view in FIG. 4.

FIG. 5 shows, in a top view, the triangular silicon parallel spring arrangement that is shown in a perspective view in FIG. 4.

Figure 6:
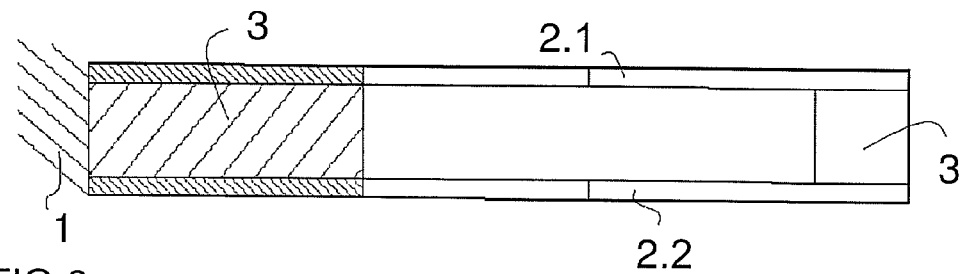
FIG. 6 shows the section B-B through the arrangement shown in FIGS. 4 and 5.

The section labeled B-B in FIG. 5 is shown in FIG. 6. The spacers 3 are made of silicon and permanently connected with the silicon parallel springs 2.1 and 2.2.

Figure 7A:
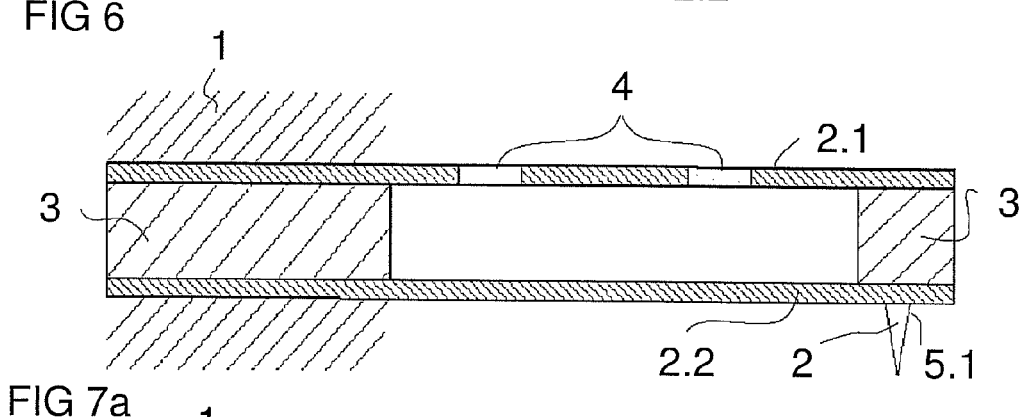
FIG. 7a shows the longitudinal section A-A through a parallel spring arrangement with probe elements on the bottom.
Figure 7B:
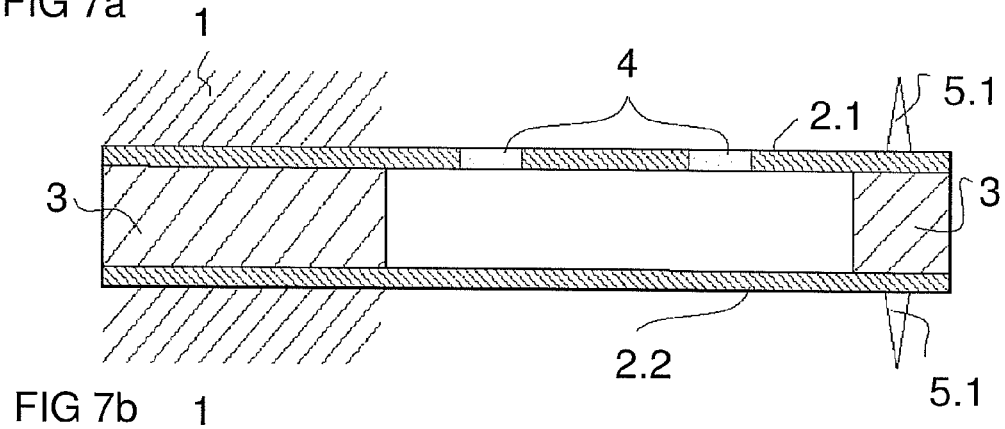
FIG. 7b shows the longitudinal section A-A through a parallel spring arrangement with probe elements on the top and bottom.

FIG. 7 shows the sectional representation A-A of a parallel spring 2 made of silicon with piezoresistive resistances 4, in which on the free ends, probe elements 5 in the form of a spike 5.1 made of silicon with very small spike radii of a few nanometers are arranged. In the embodiment shown in FIG. 7a, the spikes 5.1 are attached to the undersides of the free ends of the springs 2.2. This arrangement can be used as a parallel spring cantilever. A device in which several such cantilevers are arranged in parallel makes it possible to determine the surface profiles of objects. In this way, the surface profile deviation of an object at several points on an object can be ascertained precisely. For parallel springs 2 made of silicon, spikes 5.1 are preferably used which likewise can be formed of silicon. For parallel springs 2 made of fused quartz, the spikes 5.1 are preferably made of hard material or diamond. FIG. 7b shows an embodiment in which at the free ends of the silicon parallel springs 2, both on the top and in the opposite location at the bottom, probe spikes 5.1 made of silicon are attached. Such an arrangement can preferably be used for measuring holes or grooves.

Figure 8:
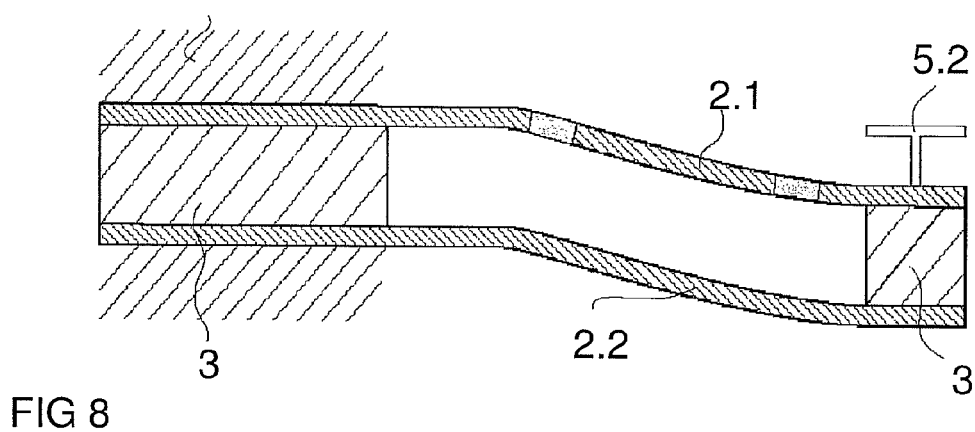
FIG. 8 shows a longitudinal section through a parallel spring arrangement with a weighing pan.

FIG. 8 shows an exemplified embodiment of a parallel spring 2 in longitudinal section with piezoresistive resistances 4. The respective ends of the upper spring 2.1 and the lower spring 2.2 are permanently connected with spacers 3 made of silicon or fused quartz. At the free ends of the upper springs 2.1, pans 5.2 are arranged for holding objects to be weighed.

Figure 9:
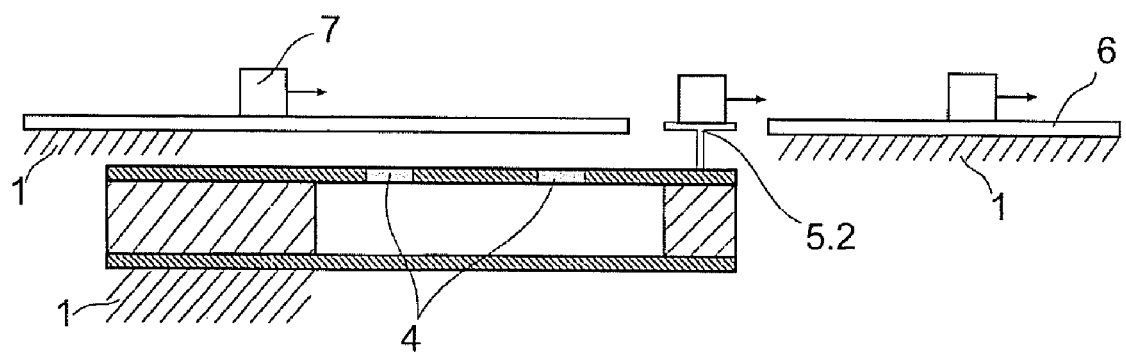
FIG. 9 shows the longitudinal section through a parallel spring arrangement with delivery and removal directions.

FIG. 9 shows an exemplified embodiment in which parallel springs 2 with weighing pans 5.2 are introduced into delivery and removal devices 6 for objects to be weighed 7. With the delivery and removal devices 6, the introduction of the objects to be weighed 7 to the weighing pans 5.2 and their removal takes place. Thus the masses of a plurality of objects to be weighed 7 can be determined simultaneously.

Figure 10:
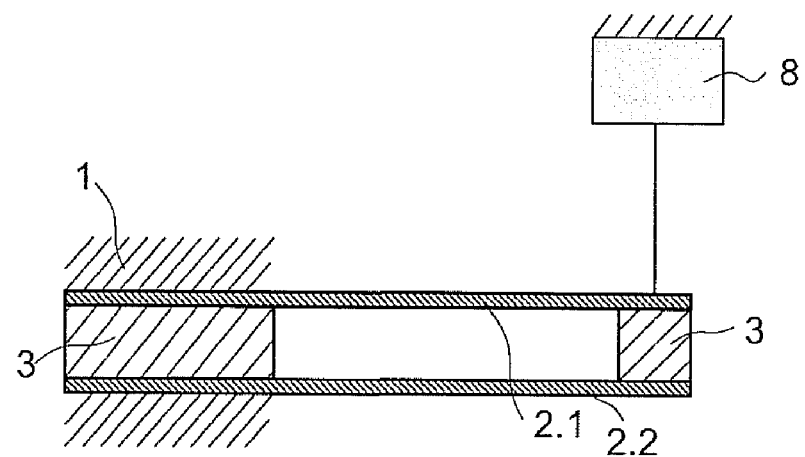
FIG. 10 shows a longitudinal section through a parallel spring arrangement with interferometric probe.

FIG. 10 shows an arrangement of parallel springs 2, the force-dependent deflections of which can be measured without contact with interferometers 8 fastened to the frame 1. The preferred interferometers 8 for use are flat-mirror interferometers. If the surfaces of the parallel springs 2.1 have adequate reflectivity at their ends, the measurement beams of the flat-mirror interferometers 8 can be aligned directly toward the surfaces of the parallel springs 2. For precise optical measurement of forces and of surface profile deviations with such arrangements, in addition to the use of single-beam flat-mirror interferometers 8 as presented here, the scanning can also take place by means of autofocus sensors.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for measuring forces with a parallel spring arrangement, the device comprising:
   a plurality of parallel springs arranged in a line;
   spacers, the parallel springs being connected together at their ends over the spacers, wherein the parallel springs and the spacers are made of silicon;

a frame for fixedly holding an end of each of the parallel springs;

measurement-technology elements arranged on free ends of the parallel springs; and a set of four piezoresistive resistances located in each of the parallel springs, each set being arranged together in a corresponding full Wheatstone bridge.

2. The device according to claim 1, wherein the parallel springs have a symmetric triangular shape from a top view.

3. The device according to claim 1, wherein the measurement technology elements located at the free ends of the parallel springs are tips made of silicon or diamond.

4. The device according to claim 1, wherein weighing pans are fastened to an upper surface of the free ends of the parallel springs.

5. The device according to claim 1, wherein the spacers physically isolate the plurality of springs from each other.

* * * * *